(No Model.)

G. L. BARRETT.
TIME INDICATOR.

No. 422,563. Patented Mar. 4, 1890.

WITNESSES
H. M. Plaisted.
Warren Hull.

INVENTOR
George L. Barrett,
By H. A. Toulmin
His Attorney.

UNITED STATES PATENT OFFICE.

GEORGE L. BARRETT, OF SPRINGFIELD, OHIO.

TIME-INDICATOR.

SPECIFICATION forming part of Letters Patent No. 422,563, dated March 4, 1890.

Application filed September 9, 1889. Serial No. 323,423. (No model.)

*To all whom it may concern:*

Be it known that I, GEORGE L. BARRETT, a citizen of the United States, residing at Springfield, in the county of Clark and State of Ohio, have invented certain new and useful Improvements in Time-Indicators, of which the following is a specification, reference being had therein to the accompanying drawings.

My invention relates to certain new and useful improvements in time-indicators; and the object is to provide means for measuring short periods of time in a simple manner, founded on the rate of flow of a liquid through an aperture in a containing-vessel, combined with a weight adjusted to overcome by gravity the weight of the liquid remaining in the said vessel at the end of each of the different periods of time.

Figure 1:
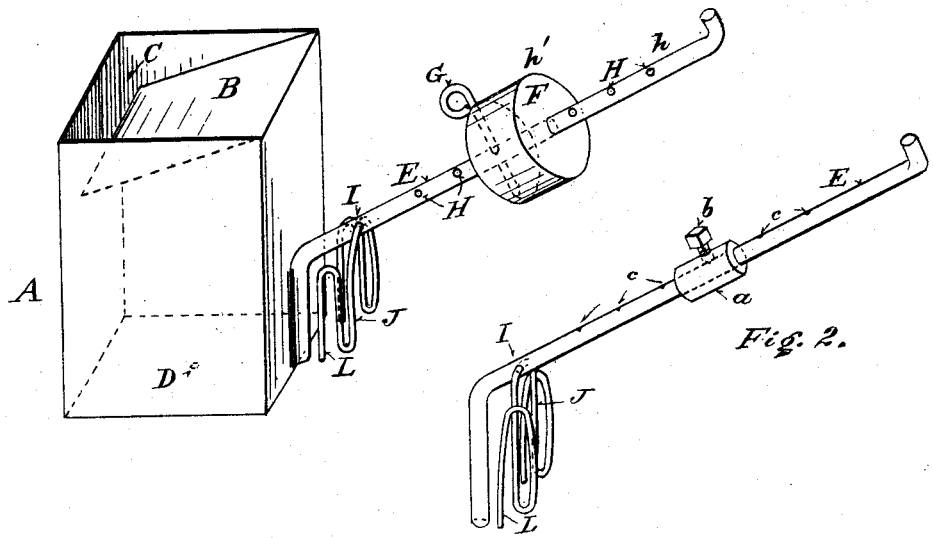
Figure 2:
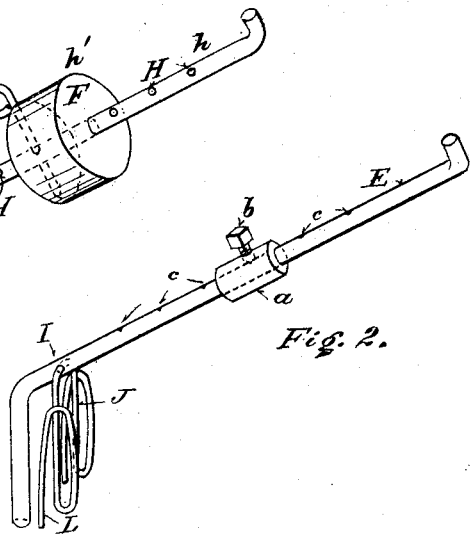
Figure 3:
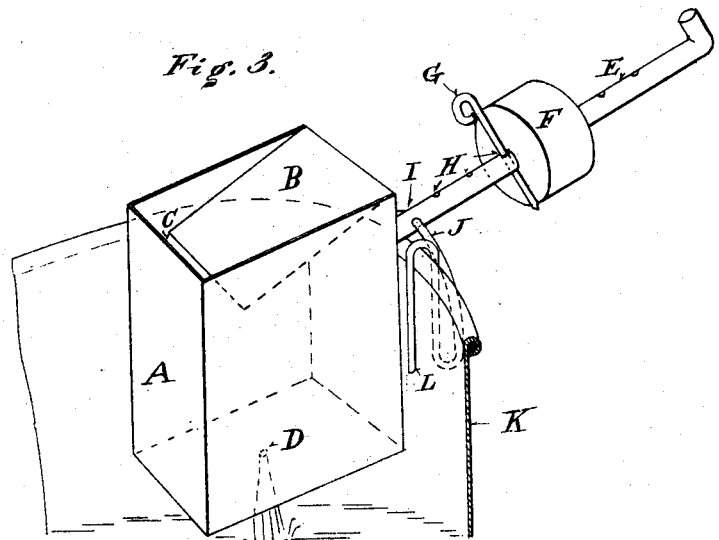

In the accompanying drawings, forming a part of this specification, and in which like reference-letters indicate corresponding parts, Figure 1 represents a perspective view of my time-indicator complete; Fig. 2, a modified form of a fulcrum-support and the lever and a stop for a weight detached, and Fig. 3 a perspective view of the indicator mounted on the edge of a vessel and discharging therein.

In Fig. 1, the letter A designates a liquid-containing vessel of four perpendicular sides, partially closed by a sloping top B, leaving an opening C for filling and having an aperture D in the bottom thereof for the exit of the contained fluid. The shape of the vessel is immaterial. Suitably secured to the vessel is an arm or lever E, showing the end bent up to form a stop for a weight F, which is slidingly mounted thereon, and which is limited in its movement by a pin G, adjusted in the holes H of said lever. Any other convenient device may be used to stop the weight at certain points on the lever—as, for instance, that shown in Fig. 2, consisting of a sleeve *a*, held by a set-screw *b*, fitting into notches *c* on the said lever. The said lever is fulcrumed at I, at which point it is pivotally mounted on a wire J, that is so bent as to engage the side of a supporting-vessel K by clips L, hooking over the same. The spring of the wire allows the thickness of a supporting-vessel to vary somewhat without affecting the steadiness of the fulcrum. A modified form of a lever and a fulcrum-support adapted to engage a vessel having a thin edge is shown in Fig. 2. It will now be understood that the weight F will exert more influence on the liquid-containing vessel A the farther it is set on the lever from the fulcrum I, and that accordingly more liquid must remain in said vessel in order to keep the weight in an elevated position. When, for instance, the weight is set at *h*, it may take, say, a half-minute from the moment of filling for sufficient liquid to flow out of A through the aperture D to allow the weight to overbalance the remainder; but when the weight is set at *h'* it will take, say, three minutes for the weight to fall, since its power is diminished by being moved nearer the fulcrum, and more liquid must flow out of the vessel A before said weight can overbalance the remainder, thereby taking a longer period of time. The top of the vessel A is inclined, so that it will readily conduct the liquid thereinto, and the lower edge thereof serves as a gage in filling said vessel. It also prevents the spilling of the remaining liquid when the vessel A is raised by the falling of the weight F.

Although the vessel has been described as containing "liquid," yet sand or its equivalent may be used, if found convenient; and, furthermore, I do not wish to limit myself in the use and application of this time-indicator.

One of the principal uses—indeed, the use principally intended—is that of timing the boiling of eggs, so as to determine when they have reached the desired degree, as soft, medium, or hard. The weight is adjusted accordingly as one or the other of these degrees is desired. The attention of the attendant is drawn to the expiration of the time by the striking of the weight against the vessel containing the eggs, as it tips the device and slides to the outer end of the rod.

Having thus fully described my invention, what I claim as new, and desire to secure by Letters Patent, is—

1. In a time-indicator, the combination, with a liquid-containing vessel having a supply-opening and an exit-orifice, of an arm or lever attached to said vessel, a suitable fulcrum-support for said lever adapted to engage a cooking pot or vessel and supporting the device, and a weight adjustably mounted upon the arm or lever.

2. In a time-indicator, the combination, with a liquid-containing vessel having an exit in the bottom for the liquid and a sloping top adapted to prevent the spilling of the remaining contents, of a lever secured to said vessel, a weight mounted thereon and devices to arrest it at predetermined points thereof, and a fulcrum-support for said indicator.

3. In a time-indicator, the combination, with a suitable liquid-containing vessel having a sloping top and an aperture in the bottom for an exit-opening, of a lever secured to said vessel, a suitable weight slidingly and adjustably mounted thereon, and a support for the said lever pivoted at the fulcrum thereof and having hooks adapted to engage the sides of a supporting-vessel, substantially as described.

In testimony whereof I affix my signature in presence of two witnesses.

GEO. L. BARRETT.

Witnesses:
WARREN HULL,
H. M. PLAISTED.